Oct. 26, 1965  J. R. LAUGHLIN  3,214,560
INDUCTION HEATING DEVICE
Filed May 21, 1963  2 Sheets-Sheet 1
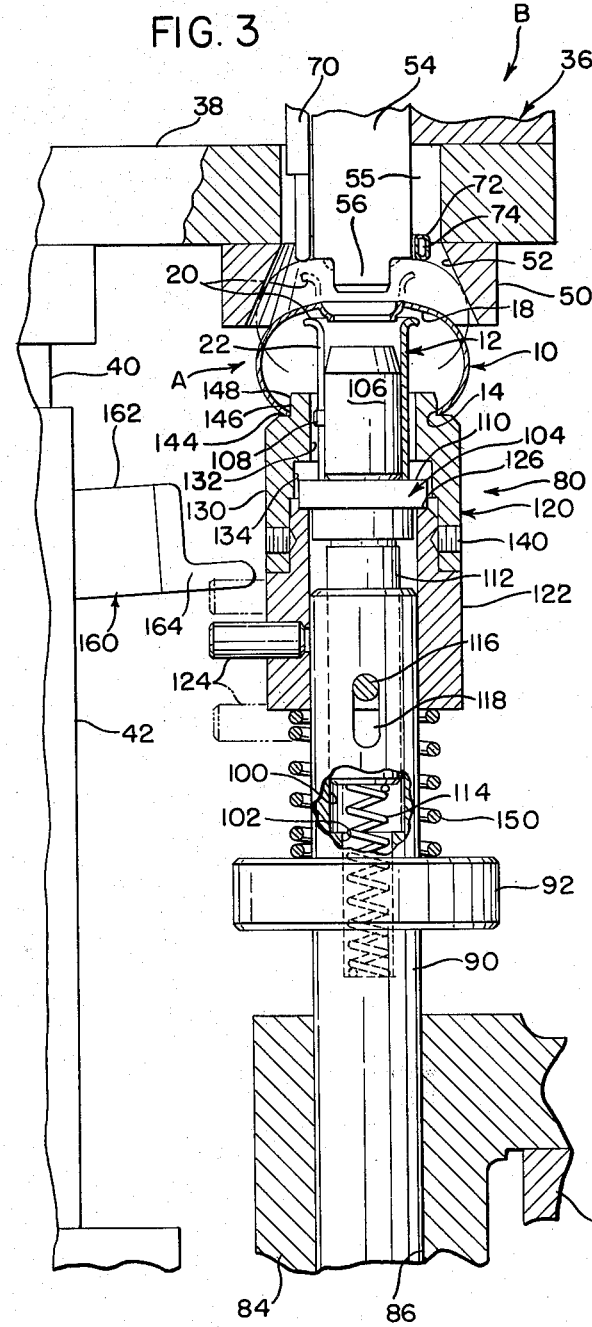
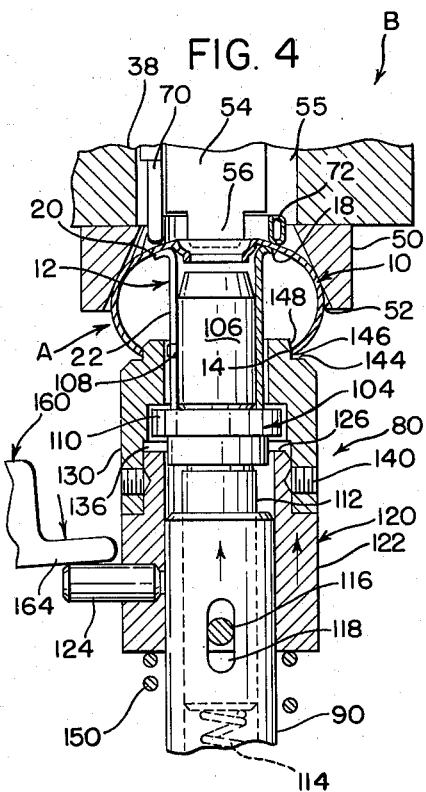
INVENTOR.
JOHN R. LAUGHLIN
BY
Tilbury & Body
ATTORNEYS Oct. 26, 1965    J. R. LAUGHLIN    3,214,560
INDUCTION HEATING DEVICE
Filed May 21, 1963    2 Sheets-Sheet 2

INVENTOR.
JOHN R. LAUGHLIN
BY
*Tillbury & Body*
ATTORNEYS

United States Patent Office 3,214,560
Patented Oct. 26, 1965

3,214,560
INDUCTION HEATING DEVICE
John R. Laughlin, Brecksville, Ohio, assignor to The Ohio Crankshaft Company, Cleveland, Ohio, a corporation of Ohio
Filed May 21, 1963, Ser. No. 281,976
12 Claims. (Cl. 219—9.5)

The present invention pertains to the art of induction heating and more particularly to an induction heating device for brazing a doorknob subassembly.

The present invention is particularly applicable to a radio frequency powered induction heating device for brazing a hollow sheet metal knob casing onto the mounting flange of a sheet metal doorknob shank to produce an inexpensive doorknob subassembly and it will be discussed with particular reference thereto; however, it is to be appreciated that the invention has much broader applications and may be used in various similar brazing operations which may be powered with any high frequency source.

The term "radio frequency" as used herein designates any frequency above the audio frequency band, i.e., over approximately 15 kc., and the term "high frequency" as used hereinafter designates any frequency above the common power line frequency, which is usually 60 cycles. Consequently, the term "high frequency" includes all radio frequencies and other lower frequencies.

A doorknob of the type used for many years to operate the keeper of an entrance door comprises a hollow knob casing and a cylindrical shank affixed thereto, with the casing receiving the key opening and the shank forming a receptacle for the locking and operating mechanisms of the doorknob. In the past, the subassembly comprising the hollow knob casing and the shank was produced by joining the hollow casing and a plurality of interlocked sleeves, collars and grommets. All of these parts were joined together by a wide variety of mechanical crimping, folding and spinning operations. Such a complex assembly operation was quite expensive because it required a substantial amount of material and labor. Consequently, the casing and shank subassembly was not only expensive, but it was also quite heavy which increased the cost of shipping this subassembly and also the cost of storing the same. Accordingly, there has been an ever-present demand for a method of assembling the doorknob subassembly comprising the casing and shank by a method and apparatus that would allow a substantial reduction in the materials required for the production of this subassembly and a reduction in the cost of assembling this subassembly.

The present invention is directed toward a doorknob casing and shank subassembly that is substantially less expensive than known subassemblies and the invention is further directed toward an apparatus for producing this less expensive casing and shank subassembly so that the production of the subassembly can be consistently performed at the high standards required by the industry.

In accordance with the present invention, there is provided an apparatus for assembling a doorknob casing onto the generally circular flange of a sheet metal doorknob shank comprising means for forcing the shank flange against a matching surface of the casing, an inductor having a generally circular shape matching the shape of the flange, means for locating the casing and flange with the flange aligned with the inductor and a radio frequency power supply for powering the inductor.

In accordance with another aspect of the present invention there is provided an apparatus for locating, with respect to a generally circular high frequency powered inductor, both a sheet metal doorknob shank having a generally circular mounting flange and a knob casing having an inner mounting surface matching the flange and an opening for receiving the shank. This apparatus comprises means for centering the casing opening with respect to the inductor, means for centering the mounting flange with respect to the inductor, means for forcing the centered mounting flange against the mounting surface of the casing, and means for allowing slight swivel movement of the casing around the centered opening of the casing so that the flange and surface will assume a continuous abutting posture.

In accordance with still a further aspect of the present invention there is provided a doorknob subassembly comprising a hollow knob casing having an inner mounting surface and an opening opposite the surface and a sheet metal shank having a generally circular mounting flange, the shank extending through the opening with the flange abutting the surface, and a high frequency brazed joint between the flange and the surface.

The primary object of the present invention is the provision of a doorknob subassembly comprising a sheet metal casing and shank which is inexpensive to produce and will withstand high torque between the shank and the casing and an apparatus for producing such a subassembly.

Another object of the present invention is the provision of such a subassembly which is produced by a high frequency brazed joint between the shank and the casing.

Still another object of the present invention is the provision of an apparatus for high frequency brazing of the joint between the hollow knob casing and a sheet metal shank which casing and shank comprise a subassembly for a doorknob.

Still another object of the present invention is the provision of an apparatus as defined above which will produce consistent, high quality joints between the casing and the shank.

Yet another object of the present invention is the provision of an apparatus of the type described above which is powered by a high frequency power supply.

These and other objects and advantages will become apparent from the following description used to illustrate the preferred embodiment of the present invention as read in connection with the accompanying drawings in which:

FIGURE 1 is a partially cross-sectioned, side elevational view illustrating a doorknob subassembly constructed in accordance with the present invention;

FIGURE 3 is an enlarged, cross sectional view illustrating the preferred embodiment of the present invention as shown in FIGURE 2; and FIGURE 4 is a fragmentary, cross sectional view showing the operating characteristics of the preferred embodiment of the present invention as shown in FIGURES 2 and 3.

Figure 2:
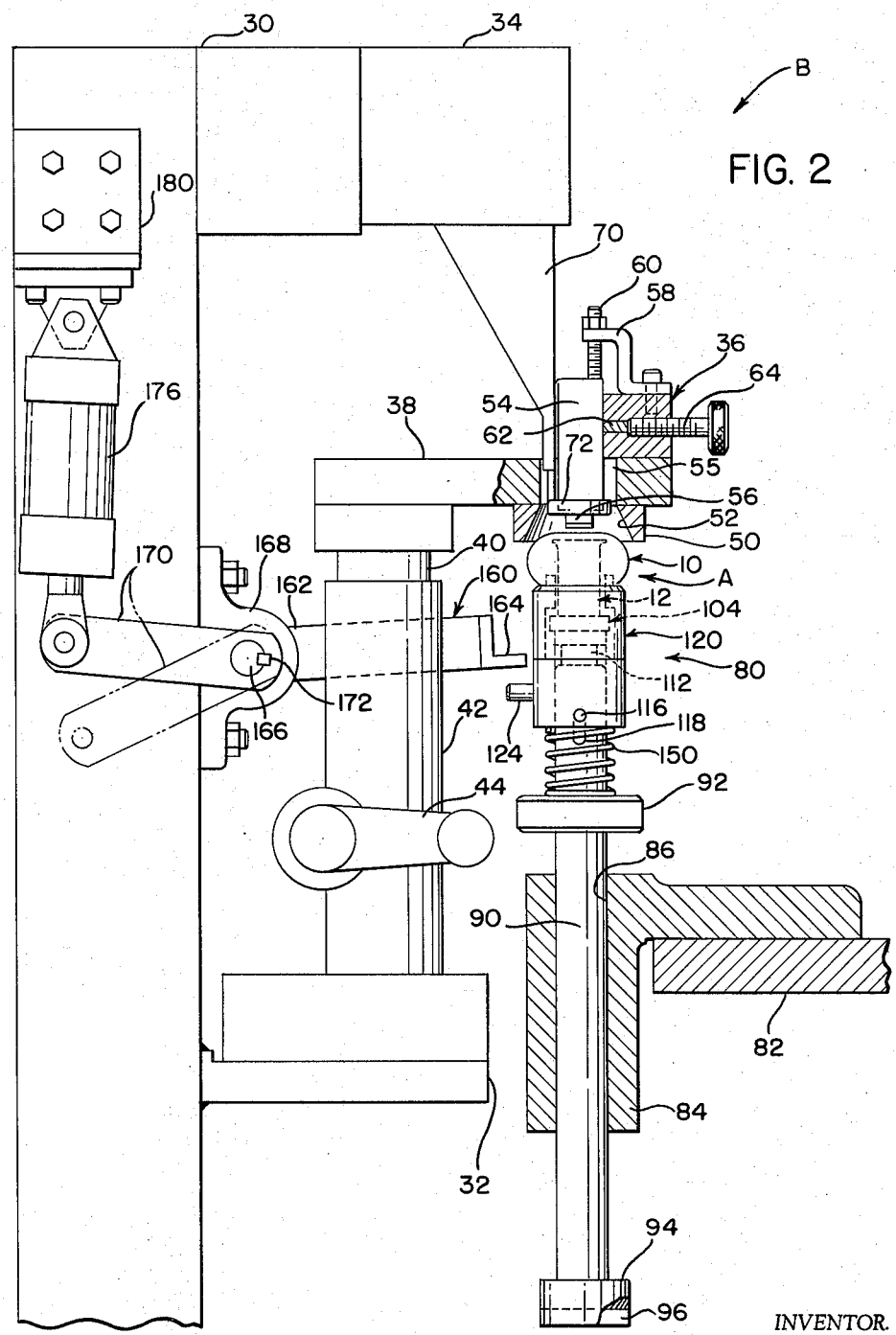
FIGURE 2 is a somewhat partially cross-sectioned, side elevational view illustrating the preferred embodiment of the present invention.

Referring now to the drawings, wherein the showings are for the purpose of illustrating a preferred embodiment of the invention only and not for the purpose of limiting same, FIGURE 1 shows a doorknob subassembly A of the type used to produce a doorknob for operating the keeper of an entrance door. In accordance with the invention, the subassembly comprises a hollow sheet metal casing 10 and a cylindrical sheet metal shank 12 and the casing is provided with a generally circular opening 14 and a key opening recess 16 on opposite sides thereof. Within the casing there is provided an inner mounting surface 18 directly opposite opening 14 for a purpose which will be hereinafter described in detail. Shank 12 is provided with a mounting flange 20 having an upper contour to allow continuous contact of the flange with the mounting surface 18 when these members are abutted.

Further, a locating slot 22 is provided in shank 12 for locating the various locking and operating mechanisms to be received within the doorknob subassembly. In accordance with the present invention, the opening 14 is so dimensioned to allow insertion of shank 12, especially flange 20, and there is provided a high frequency produced brazed joint between the upper surface of the mounting flange 20 and the inner mounting surface 18 which joint is sufficiently strong to withstand maximum torque requirements of the subassembly.

Referring now to FIGURES 2–4, there is illustrated an apparatus B constructed in accordance with the present invention for brazing the shank 12 onto the casing 10 of subassembly A. In accordance with the preferred embodiment of the present invention, the apparatus B comprises a frame 30 having a lower base 32 and an upper head 34. Spaced between the head and the base is an inductor block 36 mounted in cantilever fashion onto the end of support arm 38 which arm is secured onto the upper end of post 40 which is reciprocally received within journal sleeve 42. To adjust the vertical position of support arm 38, and thus the inductor block 36, there is provided an adjusting handle 44 which is connected to an internal pinion which coacts with an internal rack on post 40 for movement of the post in a vertical direction in response to rotation of the handle 44. The rack and pinion have not been shown because this construction is quite conventional.

Referring in more detail to the inductor block 36, the lower side of the block is provided with a ceramic, casing centering and locating ring 50 having an inner conical centering and locating surface 52 adapted to be abutted by the casing 10 in a manner to be hereinafter described in detail. There is further provided an impeder core 54 extending through opening 55 of the inductor block 36 to a position concentric with the surface 52. On the block 36 above arm 38 there is provided a bracket 58 adapted to receive an adjusting bolt 60 which bolt bears against the upper end of the impeder core 54 and determines the vertical position of the core with respect to surface 52. To secure the core 54, which is journaled within block 36, in the desired vertical position, there is provided a friction gripping, fiber slug 62 adapted to bear against the side of core 54 with a pressure determined by the position of a clamp bolt 64.

Extending downwardly from head 34 are a pair of leads 70, only one of which is shown, which leads terminate in an inductor 72 having a generally circular shape and an internal water passage 74. The inductor is connected, by known means, to a high frequency source, which in accordance with the preferred embodiment of the present invention is a radio frequency power source generating a 450 kc. voltage.

To support the casing 10 and shank 12 beneath inductor 72, apparatus B is provided with a locator fixture 80 which performs the function of centering the casing opening 14 with respect to the inductor, centering the mounting flange 20 with respect to the inductor, forcing the flange against the mounting surface 18 and, finally, allowing slight swivel movement of the casing around the opening 14 so that the flange and surface will assume a continuous abutting posture. Of course, a brazing material including a brazing alloy and a flux is provided between the flange and inner surface before the locator fixture 80 forces the flange against the inner surface.

In accordance with the preferred embodiment of the present invention, the locator fixture 80 is supported on an indexing table 82 which moves intermittently from position-to-position and the locator arrives at the station or position disclosed in FIGURES 2–4 with the casing 10 over the shank 12 and with brazing material on the upper surface of flange 20. To support the fixture 80 on the table 82, there is provided a support 84 having a generally vertical journal opening 86 for reciprocally receiving push rod 90 having an upper stop collar 92 and a lower head 94 which head is provided with a slot 96 for rotating the rod 90 at a previously visited station where the shank 12 was rotated while a fluxing material was deposited upon the flange 20.

The upper end of push rod 90 is provided with concentric bores 100, 102, best shown in FIGURE 3, which bores coact to reciprocally receive and bias in an upward direction a support 104 which supports shank 12 in a concentric position with respect to inductor 72. The shank support comprises a peg 106 having an external diameter to slidably receive the shank 12. Extending in a generally horizontal direction from the outer surface of peg 106 is a guide pin 108 which is adapted to be received within the slot 22 as the shank 12 is positioned over the peg 106. The guide pin is generally in alignment with the space between the leads of inductor 72 so that the slot is generally positioned opposite the space between the leads so that the fishtail effect at this position of the inductor has very little effect on the ultimate quality of the brazed joint.

The support shank 104 is further provided with a collar 110 and a downwardly extending shank 112 reciprocally received within bore 100 and biased in an upwardly direction by a spring 114 which is positioned within the bore 102. The modulus of the spring 114 is such that a relatively slight force can move the spring in a downward direction. Further, the length of the spring 114 is sufficient to prevent a sudden increase in the biasing force on the lower shank 112 as the spring 114 is being compressed. By providing a relatively long spring having a low modulus of elasticity, the force exerted in an upward direction upon the shank support 104 is relatively constant for downward deflections of the shank 112, at least, there is not a rapid buildup in the upward force on such downward deflection. To control the amount of relative movement between the rod 90 and shank 112, there is provided pins 116, one of which is shown, extending horizontally from opposite sides of the shank 112 which are received in slots 118 having a vertical length sufficient to allow the necessary deflection of the shank 112.

Reciprocally received upon the upper end of rod 90 there is provided a casing support 120 having a lower sleeve 122 with an outwardly extending pin 124 and an upwardly extending shoulder 126 adapted to bear against the lower surface of collar 110. An upper sleeve 130 is telescoped over sleeve 122 and includes clearance bores 132, 134 and a lower mounting bore 136 that is slidably received upon the sleeve 122. To secure the upper and lower sleeve into a somewhat unitary construction, there is provided a plurality of set screws 140 diametrically positioned around the bore 136 and adapted to be received within recesses on the outer surface of sleeve 122 as is shown in FIGURES 3 and 4. The uppermost end of upper sleeve 130 is provided with a shoulder 144 and a cylindrical surface 146 which cylindrical surface has a diameter only slightly smaller than the internal diameter of the opening 14 in shank 12. It is appreciated, that the opening 14 may take a variety of shapes and that the surface 146 is then provided with a shape which will match the shape of opening 14. It is also realized that the surface 146 may be replaced by a plurality of pins or locator lugs positioned strategically around the upper end of sleeve 130 so that the opening 14, regardless of its shape, can be received upon these pins or lugs to center the casing 10 with respect to the inductor and with respect to the previously centered shank 12. From this discussion, it is appreciated that the cylindrical surface 146 is adapted to match the opening 14 and can have a variety of equivalents which will perform this same function. To allow easy placement of the casing upon the surface 146, it is within the contemplation of the present invention to provide a relieved surface 148 leading to surface 146.

To maintain the shoulder 126 against collar 110, there is provided a biasing spring 150 positioned between the lower end of sleeve 122 and the stop 92. A retractor 160 is mounted adjacent the locator fixture 80 and includes an arm 162 having an outwardly extending finger 164 adapted to swing in an arcuate direction around pivot shaft 166 so that the finger will contact the outwardly extending pin 124. The shaft 166 is supported within shaft journal 168 and is rotated by an operating lever 170 secured onto the shaft by an appropriate key 172. Pivotal movement of the shaft is imparted by an operating cylinder 176 secured onto frame 30 by a bracket 180. Downward movement of the pin 124 by finger 164 forces the shoulder 126 away from collar 110 against the force of spring 150.

Referring now to the operation of apparatus B, the shank 12 is positioned over peg 106 and an appropriate brazing material is deposited upon the flange 20. The pin 108 aligns the slot 22 with respect to the leads of inductor 72 when the fixture 80 is in the position shown in the drawings and the peg 106 brings the shank 12 into concentric alignment with respect to the inductor. The upper surface of collar 110 supports the shank upon the shank support 104. Thereafter, the casing 10 is positioned over the cylindrical surface 146 which surface so matches the opening 14 that the opening is aligned with respect to the inductor 72. By manufacturing the casing 10 in the proper proportions, alignment of the opening 14 with respect to the inductor 72 aligns the whole casing with respect to the inductor. The casing rests upon the shoulder 144 so that the inner surface 18 is spaced from flange 20.

When fixture 80 is in the position shown in FIGURES 2-4, the rod 90 is forced upwardly by an appropriate mechanism (not shown). During this upward movement, the shank and casing support move substantially as a unit until the casing 10 is wedged into the conical surface 52 of ring 50 which prevents further upward movement of the casing support 120 and causes an additional centering effect to be exerted upon the casing 10. When the rod 90 is moved still further in an upward direction after the casing has contacted ring 50, the spring 150 then holds the casing against the ring while the rod 90 forces the shank support still further in the vertical direction until the flange 20 contacts surface 18. Still further upward movement of rod 90 causes pins 116 to move downwardly in slots 118 as is shown in FIGURE 4 so that a controlled amount of pressure is exerted between the flange and the inner surface 18. An excessive amount of pressure would cause bulging of the casing by the force being exerted against the inner surface by the flange 20.

The casing and flange are now substantially aligned with the inductor 72 and when energized, the inductor heats these two parts to a sufficient temperature to cause melting of the brazing material positioned between the flange and the inner surface. To assure proper matching between the flange and the inner surface 18, which is necessary for a sound brazed joint, the retractor 160 is actuated so that finger 164 pulls the pin 124 downwardly against the bias of spring 150. This releases the opening 14 from shoulder 144 and allows a slight swivel movement of the casing with respect to the surface 146. This slight swivel movement and the slight pressure exerted upwardly by flange 20 cause the flange and inner surface 18 to move slightly with respect to each other if this is necessary to provide a continuous abutting relationship between the flange and the inner surface. This slight swivel movement assures that there is continuous contact between the flange and the surface so that the brazing caused by the increase in temperature of the flange and casing will be completely around the flange 20 except for the gap caused by slot 22.

In accordance with the preferred embodiment of the present invention, the shank and casing are composed of thin, high thermal conductive sheet metal material, such as brass, and extreme difficulty is found in induction heating of the flange 20 and surface 18 to a sufficiently high temperature to produce a sound brazed joint. Consequently, it has been found that when the inductor 72 is powered by a source in the radio frequency range, especially 450 kc., the temperature of the joint is evenly raised to the brazing temperature before the thermal differential of the surrounding material can cause a conduction of the heat from the joint. Thus, in most instances a radio frequency is used to power inductor 72; however, in some instances when the shank and casing are composed on heavier gauge material or less thermally conductive materials, it may be possible to heat the joining surfaces between surface 18 and flange 20 by powering inductor 72 with a lower frequency.

The present invention has been described in connection with certain structural embodiments; however, it is to be appreciated that various changes may be made in the structural embodiments without departing from the intended spirit and scope of the present invention as defined by the appended claims.

Having thus described my invention, I claim:

1. An apparatus for locating, with respect to a generally circular high frequency powered inductor, both a hollow sheet metal doorknob shank having a circular mounting flange and a hollow knob casing having an inner mounting surface matching said flange and an opening for receiving said shank, said apparatus comprising means for centering said casing opening with respect to said inductor, means for centering said mounting flange with respect to said inductor, means for forcing said centered mounting flange against said mounting surface, and casing centering means including a conical surface for allowing slight swivel movement of said casing around said centered opening so said flange and surface will assume a continuous abutting posture.

2. An apparatus as defined in claim 1 wherein said mounting flange centering means comprises a peg-like member having an outer locating surface generally concentric with respect to said inductor, said outer locating surface having outer diametric dimensions slightly smaller than the internal diametric dimensions of said shank for slidably receiving said shank.

3. An apparatus as defined in claim 2 wherein said shank has a slot extending axially with respect to said shank, said generally circular inductor having an interrupted space at the power leads thereof and means for aligning said slot with respect to said space.

4. An apparatus as defined in claim 3 wherein said aligning means comprises a pin on said locating surface having a dimension smaller than the dimension of said slot.

5. An apparatus as defined in claim 1 wherein said means for centering the casing opening comprises an insulated locator ring concentric with and adjacent to said inductor and a locator surface aligned with said inductor and having an outer dimension to match said opening.

6. An apparatus as defined in claim 5 wherein said opening is generally circular and said locator surface is generally cylindrical.

7. An apparatus for locating, with respect to a generally circular high frequency powered inductor, both a hollow sheet metal doorknob shank having a circular mounting flange and a hollow knob casing having an inner mounting surface matching said flange and an opening for receiving said shank, said apparatus comprising a locator ring concentric with and adjacent to said inductor, a first support means having a member aligned with said inductor and matching said opening and a first shoulder with vertically supporting said casing, first drive means for moving said first support means upwardly so that said first shoulder forces said casing into said locator ring, second support means having a member aligned with said inductor and matching the internal dimension of said shank and a second shoulder for vertically supporting said shank, second drive means for moving said second support upwardly so that said second shoulder forces said shank flange against said inner surface of said casing, and means for lowering said first shoulder after said flange contacts said inner surface to allow slight swivel movement of said casing.

8. An apparatus as defined in claim 7 wherein said shank has a slot extending axially with respect to said shank, said generally circular inductor has an interrupted space at the power leads thereof and means for aligning said slot with respect to said space.

9. An apparatus as defined in claim 7 wherein said first support means is telescoped around said second support means and means for moving said first and second support means in unison until said casing contacts said ring, said first and second support means being reciprocal with respect to each other after said casing has contracted said ring.

10. An apparatus as defined in claim 7 wherein said second drive means includes means for limiting the force between said shank and said casing.

11. An apparatus as defined in claim 10 wherein said force limiting means includes a low modulus spring means.

12. An apparatus for assembling a knob casing onto the generally circular flange of a sheet metal doorknob shank comprising a member movable toward said knob casing and abutting said shank for forcing said shank flange against a matching surface of said casing, an inductor having a generally circular shape matching the shape of said flange, means for locating said casing and flange with said flange aligned with said inductor, a radio frequency power supply for powering said inductor, and a low modulus compression spring for transmitting a force to said member whereby the force between said shank and matching surface is determined by the amount of compression of said spring.

References Cited by the Examiner
UNITED STATES PATENTS

| | | | |
|---|---|---|---|
| 1,919,455 | 7/33 | Wilson | 16—121 |
| 2,179,441 | 11/39 | Webb et al. | 16—121 |
| 2,484,613 | 10/49 | Detuno | 219—9.5 |
| 2,625,637 | 1/53 | Garner et al. | 219—9.5 |
| 2,792,489 | 5/57 | Wohlman | 219—85 |

RICHARD M. WOOD, *Primary Examiner.*